United States Patent
Worth

(10) Patent No.: US 9,521,154 B2
(45) Date of Patent: Dec. 13, 2016

(54) DETECTING SUSPICIOUS NETWORK ACTIVITY USING FLOW SAMPLING

(75) Inventor: Kevin M. Worth, Roseville, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 1056 days.

(21) Appl. No.: 13/197,402

(22) Filed: Aug. 3, 2011

(65) Prior Publication Data
US 2013/0036469 A1 Feb. 7, 2013

(51) Int. Cl.
*G06F 21/00* (2013.01)
*H04L 29/06* (2006.01)

(52) U.S. Cl.
CPC .......... *H04L 63/1408* (2013.01); *G06F 21/00* (2013.01)

(58) Field of Classification Search
CPC .............................. H04L 63/1408; G06F 21/00
USPC ...................................................... 726/22–25
See application file for complete search history.

(56) References Cited

U.S. PATENT DOCUMENTS

| | | | |
|---|---|---|---|
| 7,644,150 B1 | 1/2010 | Nucci et al. | |
| 8,005,009 B2* | 8/2011 | McKee et al. | 370/253 |
| 8,014,937 B2* | 9/2011 | Smyth et al. | 701/119 |
| 8,090,524 B2* | 1/2012 | Chapman et al. | 701/117 |
| 8,149,706 B2* | 4/2012 | Turlington et al. | 370/233 |
| 8,160,805 B2* | 4/2012 | Downs et al. | 701/117 |
| 8,335,160 B2* | 12/2012 | Carvalho et al. | 370/235.1 |
| 8,477,648 B2* | 7/2013 | Breslin et al. | 370/252 |
| 2002/0144156 A1* | 10/2002 | Copeland, III | 713/201 |
| 2004/0215976 A1* | 10/2004 | Jain | 713/201 |
| 2005/0210533 A1* | 9/2005 | Copeland et al. | 726/23 |
| 2006/0288417 A1 | 12/2006 | Bookbinder et al. | |
| 2007/0180527 A1* | 8/2007 | Yeom | 726/23 |

(Continued)

OTHER PUBLICATIONS

Kim, et al., "A Flow-based Method for Abnormal Network Traffic Detection", Dept. of Computer Science and Engineering, POSTECH, Retrieved from http://dpnm.postech.ac.kr/papers/NOMS/04/security-analysis/camera-ready/attack-analysis-v5-revision.pdf, Date: Not later than 1997, 14 pages.

(Continued)

*Primary Examiner* — William Powers
*Assistant Examiner* — Tongoc Tran
(74) *Attorney, Agent, or Firm* — Brooks, Cameron & Huebsch, PLLC

(57) ABSTRACT

Methods, media, and computing devices for network security can include receiving flow sampled network traffic from multiple network devices with a network monitoring computing device for network traffic among multiple computing devices, comparing source ports and destination ports in the flow sampled network traffic to a list of approved ports with the network monitoring computing device, and detecting suspicious network activity for flow sampled network traffic having a source port and a destination port exceptional to the list of approved ports with the network monitoring computing device. Alternatively, a suspicious network activity list can be maintained for flow sampled network traffic having source and destination ports exceptional to the list of approved ports. Alternatively, a network administrator can be alerted when a port is added to the suspicious network activity list in response to a total number of ports in the suspicious network activity list exceeding a threshold number.

15 Claims, 6 Drawing Sheets

(56) References Cited

U.S. PATENT DOCUMENTS

| | | | |
|---|---|---|---|
| 2007/0214504 A1 | 9/2007 | Comparetti et al. | |
| 2007/0226781 A1 | 9/2007 | Chen et al. | |
| 2007/0283441 A1* | 12/2007 | Cole et al. | 726/25 |
| 2007/0289017 A1* | 12/2007 | Copeland, III | 726/23 |
| 2008/0086776 A1 | 4/2008 | Tuvell et al. | |
| 2010/0107257 A1 | 4/2010 | Ollmann | |
| 2010/0154032 A1 | 6/2010 | Ollmann | |
| 2010/0281539 A1 | 11/2010 | Burns et al. | |
| 2011/0113489 A1* | 5/2011 | Nakhre et al. | 726/22 |
| 2011/0185426 A1* | 7/2011 | Zuk | 726/23 |
| 2013/0031635 A1* | 1/2013 | Lotem et al. | 726/25 |

OTHER PUBLICATIONS

Unknown "Traffic Monitoring using sFlow", Retrieved from http://www.sflow.org/sFlowOverview.pdf, Date: 2003, 5 pages.

* cited by examiner

200

| service | port | protocol | description |
|---|---|---|---|
| ftp-data | 20 | TCP/UDP | File Transer [Default Data] |
| ftp | 21 | TCP/UDP | File Transer [Control] |
| ssh | 22 | TCP/UDP | SSH Remote Login Protocol |
| telnet | 23 | TCP/UDP | Telnet |
| smtp | 25 | TCP/UDP | Simple Mail Transfer |
| gopher | 70 | TCP/UDP | Gopher |
| www-http | 80 | TCP/UDP | World Wide Web HTTP |
| npp | 92 | TCP/UDP | Network Printing Protocol |
| pop3 | 110 | TCP/UDP | Post Office Protocol - Version 3 |
| sftp | 115 | TCP/UDP | Simple File Transfer Protocol |
| sqlserv | 118 | TCP/UDP | SQL Services |
| snmp | 161 | TCP/UDP | SNMP |
| bgp | 179 | TCP/UDP | Border Gateway Protocol |
| irc | 194 | TCP/UDP | Internet Relay Chat Protocol |
| ipx | 213 | TCP/UDP | IPX |
| imap3 | 220 | TCP/UDP | Interactive Mail Access Protocol v3 |
| icq | 2109 4000 | TCP/UDP | ICQ used for chat |

| 216 | 210-S | 210-D | 218-S | 218-D | 220 |
|---|---|---|---|---|---|
| No. | src_port | dst_port | src_addr | dst_addr | # of hits |
| 1 | 25343 | +view+ | +view+ | +view+ | 1337 |
| 2 | +view+ | 46184 | +view+ | +view+ | 612 |
| 3 | +view+ | 25418 | +view+ | +view+ | 24 |
| 4 | 1294 | +view+ | +view+ | +view+ | 17 |
| 5 | +view+ | 8579 | +view+ | +view+ | 8 |
| 6 | +view+ | 44118 | +view+ | +view+ | 5 |
| 7 | +view+ | 48864 | +view+ | +view+ | 2 |
| 8 | 28337 | 55852 | 10.15.16.1 | 10.15.1.1 | 1 |
| 9 | 40374 | 37473 | 10.15.16.1 | 10.15.1.1 | 1 |
| 10 | 51784 | 16514 | 10.15.16.2 | 10.15.2.1 | 1 |
| 11 | 63197 | 38443 | 10.15.16.6 | 10.16.0.0 | 1 |
| 12 | 41038 | 4582 | 10.15.16.6 | 0.0.0.0 | 1 |

Fig. 2B

DETECTING SUSPICIOUS NETWORK ACTIVITY USING FLOW SAMPLING

BACKGROUND

It can be difficult for a network administrator to discern what activity, such as protocols, programs, and/or services, are running on systems within a network. There may be a certain set of expected protocols, programs, and/or services being used by major business functions on the network. However, there may also be other protocols, programs, and/or services such as instant messaging programs, games, etc., that individual users may have installed that could be interfering with operation of the network. Furthermore, malicious programs such as viruses and worms may have been installed on systems without users' or administrators' knowledge. Such activity can be difficult to identify and track.

BRIEF DESCRIPTION OF THE DRAWINGS

FIG. 2A is a table illustrating an example of a list of approved ports according to the present disclosure.

FIG. 2B is a table illustrating an example of a suspicious network activity list according to the present disclosure.

DETAILED DESCRIPTION

Figure 1A:
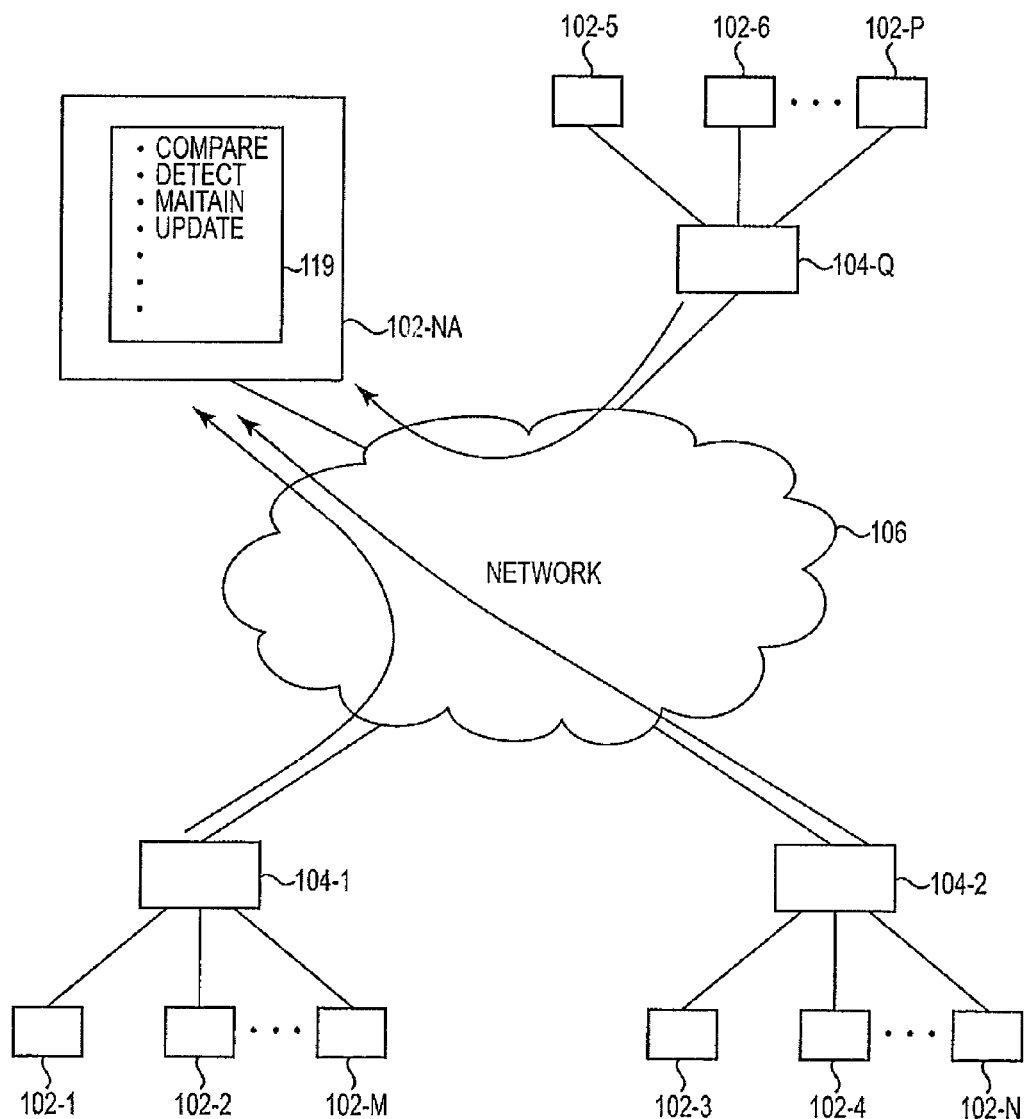
FIG. 1A illustrates an example of a network in which suspicious network activity can be detected using flow sampling according to the present disclosure.

The present disclosure provides methods, computing device readable media, network monitoring computing devices, and systems for network security. Network security can include receiving flow sampled network traffic from multiple network devices with a network monitoring computing device for network traffic among multiple computing devices. Network security can also include comparing source ports and destination ports in the flow sampled network traffic to a list of approved ports with the network monitoring computing device. Network security can also include detecting suspicious network activity for flow sampled network traffic having a source port and a destination port exceptional to the list of approved ports with the network monitoring computing device. Alternatively and/or in addition, network security can include maintaining a suspicious network activity list for flow sampled network traffic having source and destination ports exceptional to the list of approved ports. Alternatively and/or in addition, network security can include alerting a network administrator when a port is added to the suspicious network activity list in response to a total number of ports in the suspicious network activity list exceeding a threshold number.

Some previous approaches to network security have centered around individual computing devices in the network such as by installing security software on individual computing devices. However, such approaches require the software to be installed on all of the computing devices in the network for the solution to have an opportunity to be effective. Other previous approaches to network security have included the use of access control lists (ACLs) in network devices (e.g., network hardware, like firewalls, routers, and switches). Using firewalls or ACLs may help specific, important points on the network to be sanitized, but such approaches often block valid network traffic with which the network administrator may not want to interfere, as such interference may frustrate users who may be using a non-standard, yet important service, resulting in headaches for both users and administrators.

For some networks, particularly large networks, it can be difficult for network administrators to easily discern what activity, such as protocols, programs, and/or services, are running on systems within the network. A list of approved ports can reflect network traffic that an administrator expects to see on the network. The present disclosure allows the network administrator to track possibly unauthorized use of software, a possibly malicious user, and/or malicious programs (e.g., viruses, worms, etc.) and take action to investigate or quarantine the offending network activity and/or users.

In the following detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit or digits correspond to the drawing figure number and the remaining digits identify an element or component in the drawing. Similar elements or components between different figures may be identified by the use of similar digits. For example, 102-1 may reference element "02" in FIG. 1A, and a similar element may be referenced as 302 in FIG. 3. As used herein, the designators "N," "M," P," "Q," "R," "S," and "T" particularly with respect to reference numerals in the drawings, indicate that a number of the particular feature so designated can be included with a number of embodiments of the present disclosure. More or fewer of the feature so designated and illustrated may be included with examples of the present disclosure.

FIG. 1A illustrates an example of a network in which suspicious network activity can be detected using flow sampling according to the present disclosure. Networks can include a plurality of computing devices 102 interconnected by a plurality of network devices 104. For example, computing devices 102-1, 102-2, . . . , 102-M are connected to other portions of the network via network device (e.g., switch) 104-1 and network cloud 106. Computing devices 102-3, 102-4, . . . , 102-N are connected via network device 104-2. Computing devices 102-5, 102-6, . . . , 102-P are connected via network device 104-Q.

Computing devices 102 can include processor resources in communication with memory resources. Examples of computing devices 102 include servers, desktop PCs, laptops, and workstations, among others. Network devices 104 can include hardware logic (e.g., in the form of application specific integrated circuits (ASICs) associated with a number of physical network ports). Network devices 104 may also include processor resources in communication with memory resources. Examples of network devices 104 include switches, routers, hubs, bridges, and wireless access points, among others. Computing devices 102 may include a network device 104 such as a network interface controller to enable the computing device 102 to communicate with other computing devices 102 via the network.

The network can take the form of a local area network (LAN) and/or wide area network (WAN), among other network types. A network can provide a communication system that links two or more computing devices and/or peripheral devices such as printers, facsimile machines, and copy machines, and allows users to access resources on other computing devices, for example to exchange messages with other users. A network allows users to share resources on their own computing devices with other network users and to access information on centrally located systems or systems that are located at remote offices. It may provide connections to the Internet or to the networks of other organizations. Users may interact with network-enabled software applications to make a network request, such as to get a file or print on a network printer. Applications may also communicate with network management software, which can interact with network hardware to transmit information between devices on the network.

A system for network security can include a plurality of user computing devices 102 and a plurality of network devices 104 coupled to the plurality of user computing devices 102 to flow sample network traffic for the plurality of user computing devices 102. Flow sampling (e.g., statistical flow sampling) network traffic can include monitoring application level traffic flows at wire speed on multiple interfaces simultaneously. Each network device 104 (e.g., switches with statistical flow sampling enabled) can flow sample the network traffic flowing therethrough (e.g., a certain percentage of the number of packets flowing therethrough). Network devices 104 can include an ASIC configured to sample network packets and record forwarding/routing table entries associated with each packet. Flow sampling can take place at wire speeds without the execution of instructions (e.g., software) by a processor.

The plurality of network devices 104 can send the flow sampled network traffic to a network monitoring computing device 102-NA (e.g., as indicated by the arrows pointing from each of the network devices 104 to the network monitoring computing device 102-NA). For example, the network devices 104 can package flow sampled network traffic into datagrams (e.g., uniform datagram protocol, UDP, packets) that can be forwarded to a network monitoring computing device 102-NA for processing. Examples of data contained in the datagrams can include a source port, a destination port, a source address, a destination address, service information, protocol information, and/or other information regarding sampled packets. The network monitoring computing device (e.g., a network management workstation) 102-NA can be coupled to the plurality of network devices 104 (e.g., directly and/or via a network cloud 106) to perform a number of functions (e.g., via analysis engine 119) as described herein. For example, the network monitoring computing device can be configured to compare source ports and destination ports in the flow sampled network traffic to a list of approved ports. The list of approved ports can be created and/or maintained by a network administrator for network traffic that is approved on the network. As used herein "source ports," "destination ports," "approved ports," and the like refer to ports as an application and/or process specific software construct serving as a communications endpoint (e.g., used by transport protocols) as opposed to physical network ports (e.g., as part of network devices such as switches). An example of a list of approved ports is provided and described in more detail with respect to FIG. 2A.

The network monitoring computing device 102-NA can be configured to maintain a suspicious network activity list for flow sampled network traffic having neither source ports nor destination ports on the list of approved ports. That is, a flow sampled network packet (e.g., a suspicious packet) that has both a source port and a destination port that are not included on the list of approved ports can cause the suspicious network activity list to be updated. Updating the suspicious network activity list can include adding one or more of the source port, the destination port, the source address, and the destination address from the suspicious packet to the suspicious network activity list. When a source port and/or destination port is added to the suspicious network activity list, a source address and/or destination address from the suspicious packet can be associated therewith. In some instances, one or more ports corresponding to a suspicious network packet may already be included on the suspicious network activity list. In such instances, updating the suspicious network activity list can include associating the corresponding source address and/or destination address with the port that is already on the suspicious network activity list. An example of a suspicious network activity list is provided and described in more detail with respect to FIG. 2B.

The network monitoring computing device 102-NA can be configured to alert a network administrator when a port is added to the suspicious network activity list in response to a total number of ports in the suspicious network activity list exceeding (e.g., above or below) a threshold number of ports. Alerting a network administrator can include providing a visual indication on a graphical user interface on the network monitoring computing device 102-NA, providing an audible indication, wirelessly contacting the network administrator, and/or other forms of alert. The threshold number of ports is described in more detail herein. In some examples, the network monitoring computing device 102-NA can be configured to alert by network administrator to restrict at least one of the suspicious network activity and a particular one of the plurality of user computing devices associated with the suspicious network activity.

Figure 1B:
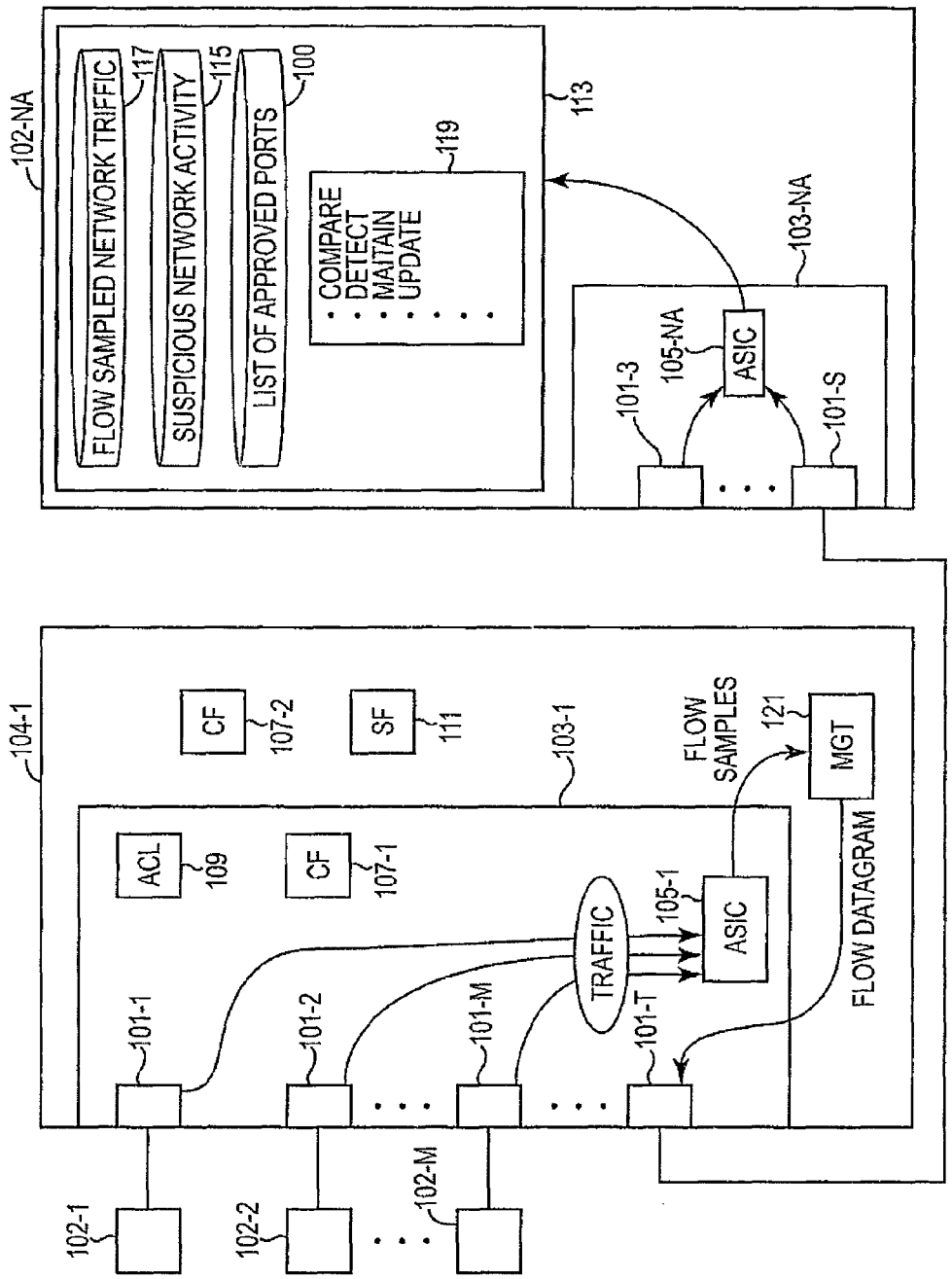
FIG. 1B illustrates a more detailed view of a portion of the example of the network in FIG. 1A in which suspicious network activity can be detected using flow sampling according to the present disclosure.

FIG. 1B illustrates a more detailed view of a portion of the example of the network in FIG. 1A in which suspicious network activity can be detected using flow sampling according to the present disclosure. The network device 104-1 can include a number of printed circuit boards, or "blades", which can include a number of network chips, e.g., chip 103-1, including logic circuitry 105-1 (hardware). Each network chip 103-1 can include a number of physical network ports 101-1, 101-2, . . . , 101-M, . . . , 101-T to send and receive data packets (network traffic) throughout the network. The logic circuitry 105-1 of the number of network chips 103-1 can be in the form of an application specific integrated circuit (ASIC) 105-1 and include logic to serve as a media access controller (MAC). The number of ports 101-1, 101-2, . . . , 101-M, . . . , 101-T can be included on a network chip 103-1 and have access to logic circuitry 105-1 associated with any network chip through a crossbar, crosslink, and/or switching fabric (SF) 111.

Flow sampling can be used to detect suspicious network activity in lieu of or in addition to other methods such as the use of network appliances dedicated to detecting suspicious packets and/or ACLs, among others. Network appliances (e.g., checking functionalities, CF) 107-1, 107-2 can be connected to a network device 104-1. A CF 107-1, 107-2 may be embedded, within a network device either on or off the network chip 103-1, either as a service or security plug-in blade. The CF 107-1, 107-2 can be an intrusion detections system (IDS), or another diagnostic device, accounting device, counting device, etc., as may be supplied by a third party vendor of network checking devices. Examples are not limited to those given here. In some examples, a network device 104-1 can handle packets received from a port 101-1, 101-2, . . . , 101-M according to an ACL 109.

A number of computing devices 102-1, 102-2, . . . , 102-M are connected to the network device 104-1 via a number of physical network ports 101-1, 101-2, . . . , 101-M on a network chip 103-1 of the network device 104-1. Each computing device 102-1, 102-2, . . . , 102-M in the network can be physically associated with a physical network port 101-1, 101-2, . . . , 101-M of a network device 104-1 to which it is connected. Information in the form of packets can be passed through the network. Data frames, or packets, can be transferred between network devices by means of a network device's (e.g., switch's) logic link control (LLC)/media access control (MAC) circuitry, or "engines", as associated with ports on a network device. A network device 104-1 can forward packets received from a source to a destination based on the header information in received packets. A network device 104-1 can also forward packets from a given network to other networks through physical network ports on one or more other network devices. While an Ethernet network is described herein, examples are not limited to use in an Ethernet network, and may be equally well suited to other network types (e.g., asynchronous transfer mode (ATM) networks), etc.

The logic circuitry 105-1 can receive traffic from each of the ports 101-1, 101-2, . . . , 101-M, as indicated by the arrows from the ports 101-1, 101-2, . . . , 101-M to the logic circuitry 105-1. The logic circuitry can flow sample the network traffic as described herein and send the flow samples to management circuitry 121. Management circuitry can include processing and memory resources and/or logic circuitry to create flow datagrams (e.g., sFlow datagrams, UDP packets, etc.) from the flow samples. The management circuitry 121 can send the flow datagrams to a network monitoring computing device 102-NA (e.g., a "collector"). For example, the flow datagrams can be sent from a physical network port 101-T of the network device 104-1 to a physical network port 101-S of the network monitoring computing device 102-NA.

The network monitoring computing device 102-NA can include a network chip 103-NA including a number of physical network ports 101-3, . . . , 101-S. The physical network ports 101-3, . . . , 101-S can communicate with logic circuitry (e.g., ASIC) 105-NA of the network chip 103-NA. The logic circuitry 105-NA can communicate flow sampled network traffic received from a number of network devices (e.g., network device 104-1) to resources 113 of the network monitoring computing device. Such resources 113 can include processing and memory resources (e.g., analogous to those illustrated and described with respect to FIG. 4. The resources 113 can include storage of flow sampled network traffic 117, a suspicious network activity list 115, and/or a list of approved ports 100. The resources can provide an analysis engine 119. The analysis engine can perform the functions described herein with respect to the network monitoring computing device 102-NA (e.g., comparing source ports and destination ports in the flow sampled network traffic 117 to a list of approved ports 100, detecting suspicious network activity for flow sampled network traffic 117 having a source port or a destination port exceptional to (e.g., "not on") the list of approved ports 100, maintaining a suspicious network activity list 115 for flow sampled network traffic 117 having source and destination ports exceptional to the list of approved ports 100, and/or alerting a network administrator when a port is added to the suspicious network activity list 115 in response to a total number of ports in the suspicious network activity list 115 exceeding a threshold number, among others).

FIG. 2A is a table illustrating an example of a list of approved ports 200 according to the present disclosure. The list of approved ports 200 can be created and/or maintained by a network administrator. The list of approved ports 200 can include services 208, ports 210, protocols 212, and descriptions 214, among other information. As illustrated, each port 210 on the list can include additional information to help a network administrator identify the reason that network traffic associated with the port has been approved. In some instances a particular service 208 may be associated with more than one port, such as "icq," which is associated with ports 2109 and 4000. Although the protocols 212 are only illustrated as "TCP/UDP," the protocols 212 can include more or fewer protocols than TCP/UDP for each port 210.

FIG. 2B is a table illustrating an example of a suspicious network activity list 215 according to the present disclosure. The suspicious network activity list 215 includes source ports ("src_port") 210-S, destination ports ("dst_port") 210-D, source addresses ("arc_addr") 218-S, destination addresses ("dst_addr") 218-D, and a number of addresses associated with each port on the list ("# of hits") 220. The suspicious network activity list 215 can be sorted in order of the number of addresses associated with each port and numbered 216 accordingly. Thus, for example, entry number 1 includes 1337 hits, while entry number 12 includes only 1 hit. Although the example illustrated in FIG. 2B is sorted in descending order, examples are not so limited, as the list 215 can be sorted in ascending order.

The suspicious network activity list 215 can include information related to flow sampled network traffic having neither source ports nor destination ports on the list of approved ports. The suspicious network activity list 215 can be updated when new suspicious packets are detected. Updating the suspicious network activity list 215 can include adding one or more of the source port 210-S and the destination port 210-D to the list when the list does not already contain that port. If the list already contains the port, then one or more of the source address 218-S and the destination address 218-D from the suspicious packet can be added to the list in association with the previously included port. For example, entry number 4 includes source port "1294" and ("+view+") listed for both the source address 218-S and the destination address 218-D indicating that more than one source address 218-S and destination address 218-D are associated therewith. Likewise, for the same entry, the destination port 210-D is listed as ("+view+") indicating that more than one destination port is associated with source port "1294."

Those entries having more hits 220 (e.g., more addresses associated with a particular port) can indicate either a legitimate service or legitimately suspicious behavior (e.g., as opposed to behavior that appears suspicious, but is in fact legitimate). A relatively large number of hits 220 can indicate that the service is legitimate because many users are using or attempting to use it. Likewise a relatively large number of hits 220 can indicate malicious network traffic such as viruses, worms, or other malicious network traffic.

Thus, sorting the suspicious network activity list 215 by number of hits 220 can allow a network administrator to quickly identify either legitimate network traffic that should be added to the list of trusted ports or malicious network traffic that should be addressed accordingly. Network traffic having relatively fewer hits 220 is less likely to require the immediate attention of the network administrator and can therefore be relegated to the bottom of the list. The network administrator can use the source addresses 218-S and the destination addresses 218-D to help determine what service is associated with the suspicious network traffic (e.g., 100 Windows computing devices and Windows Domain Controllers may indicate that the service is a legitimate Microsoft Windows service). Ideally, the suspicious network traffic list 215 should be empty. Once examples of the present disclosure have been implemented to "tune" the network, any new entries to the list can generate an alert for the network administrator.

Figure 3:
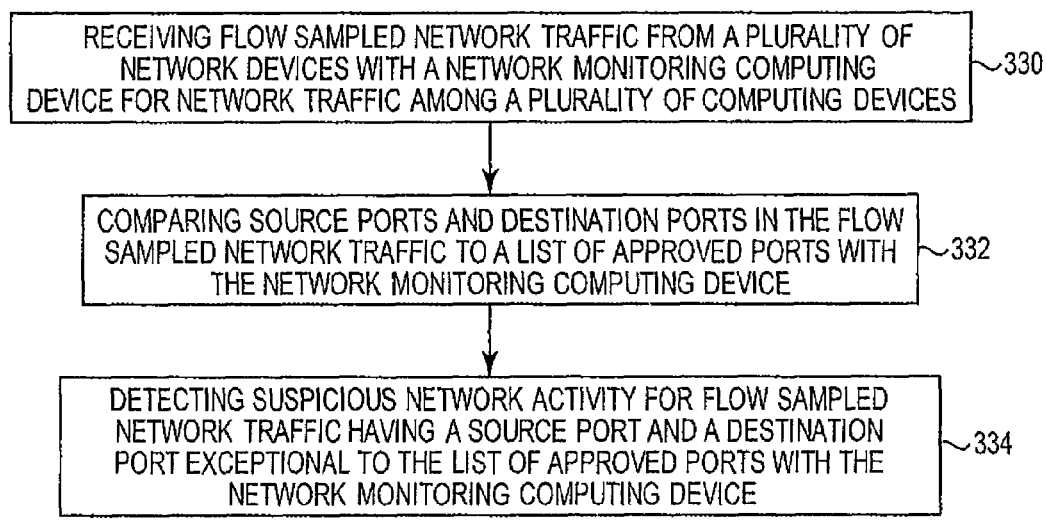
FIG. 3 is a block diagram illustrating an example of a method for detecting suspicious network activity using flow sampling according to the present disclosure.

FIG. 3 is a block diagram illustrating an example of a method for detecting suspicious network activity using flow sampling according to the present disclosure. The method can include receiving flow sampled network traffic from a plurality of network devices with a network monitoring computing device for network traffic among a plurality of computing devices as indicated at 330. The method can include comparing source ports and destination ports in the flow sampled network traffic to a list of approved ports with the network monitoring computing device as indicated at 332. The method can include detecting suspicious network activity for flow sampled network traffic having neither source ports nor destination ports on the list of approved ports with the network monitoring computing device as indicated at 334.

Detecting suspicious network activity can include adding at least one of a source port and a destination port from the flow sampled network traffic that is not on the list of approved ports to a suspicious network activity list. At least one of the source port and the destination port on the suspicious network activity list can be associated with a corresponding source address or destination address for each instance of the at least one of the source port and the destination port in the flow sampled network traffic. The suspicious network activity list can be sorted in order (e.g., descending order) according to a number of addresses associated with each port in the suspicious network activity list. An input can be received from the network administrator to remove a particular port from the suspicious network activity list and add the particular port to the list of approved ports (e.g., when the network administrator approves of the previously suspicious network activity).

The received flow sampled network traffic can be stored in a database and the suspicious network activity list can be populated with the detected suspicious network activity as described herein. In response to the list of approved ports being updated, the suspicious network activity list can be repopulated using the stored flow sampled network traffic from the database according to the updated list of approved ports. Repopulating the suspicious network activity list can include comparing source ports and destination ports in the flow sampled network traffic stored in the database with the updated list of approved ports, and detecting suspicious network activity for the stored flow sampled network traffic having neither source ports nor destination ports on the updated list of approved ports. In some examples, the suspicious network activity list can be erased in response to the list of approved ports being updated.

Figure 4:
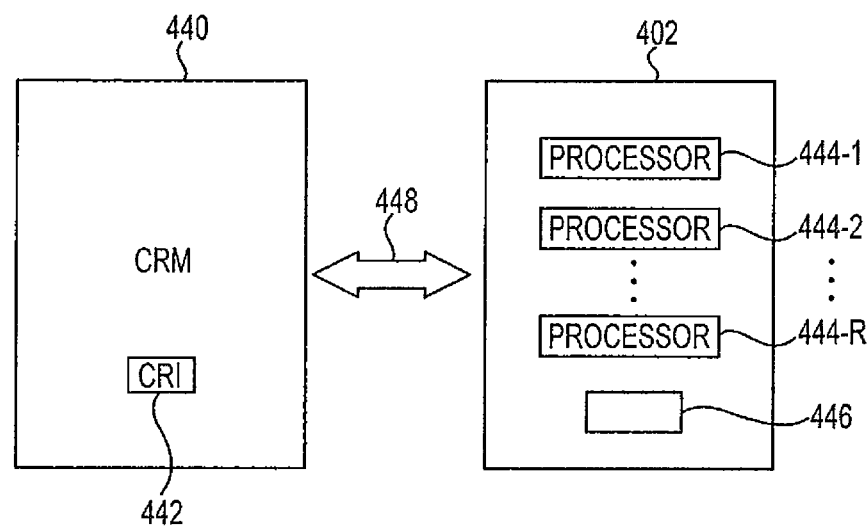
FIG. 4 illustrates a block diagram of an example of a computing device readable medium in communication with processor resources according to the present disclosure.

FIG. 4 illustrates a block diagram of an example of a computing device readable medium 440 in communication with processing resources 444-1, 444-2, . . . , 444-R according to the present disclosure. The computing device readable medium (CRM) 440 can include computing device readable instructions 442 to cause a computing device to receive flow sampled network traffic from a plurality of network devices for network traffic among a plurality of computing devices, compare source ports and destination ports in the flow sampled network traffic to a list of approved ports, and maintain a suspicious network activity list for flow sampled network traffic having neither source nor destination ports on the list of approved ports.

The CRM 440 can include instructions 442 to cause the computing device to add at least one of a source port and a destination port to the suspicious activity list for the flow sampled network traffic having neither source nor destination ports on the list of approved ports. The CRM 440 can include instructions 442 to cause the computing device to add at least one corresponding source address and corresponding destination addresses to the suspicious activity list for each instance of the at least one of the source port and the destination port in the flow sampled network traffic. For example, a particular flow sampled packet may include a source port, a destination port, a source address, and a destination address. More than one flow sampled packet may include a particular source port or destination port (e.g., a suspicious port) which is not on the list of approved ports. As such, a source and/or destination address associated with each flow sampled packet including the suspicious port may be included on the suspicious network activity list in association with the suspicious port.

The CRM 440 can include instructions 442 to cause the computing device to maintain the suspicious network activity list and include instructions to sort the suspicious network activity list in descending order according to a number of addresses associated with each port in the suspicious network activity list. The CRM 440 can include instructions 442 to display the sorted suspicious network activity list to a network administrator. Such examples can be beneficial by allowing the network administrator to quickly identify services whose associated ports should be added to the list of approved ports because such services are more likely to have a high number of hits and therefore have a high number of corresponding addresses from multiple users using the services. Another advantage is that malicious behavior can be more easily identified. For example, a virus, a worm, or other malicious network traffic can be more likely to generate a lot of network traffic.

The CRM 440 can include instructions 442 to cause the computing device to alert a network administrator when a port is added to the suspicious network activity list in response to a total number of ports in the suspicious network activity list exceeding (e.g., above or below) a threshold number of ports. Such examples can be beneficial in controlling the number of alerts a network administrator receives so that the alerts are meaningful and not ignored. For example, at initialization of the instructions, the approved port list may be immature for a particular network such that the network includes a significant amount of valid network activity associated with ports that are not on the list of approved ports (e.g., suspicious ports). In such instances, a relatively low threshold number of ports for the suspicious network activity list may be beneficial so that network traffic generating a large number of suspicious ports does not cause an alert (e.g., during a maturation process of the list of approved ports). The CRM 440 can include instructions 442 to receive a modification to the threshold number of ports. For example, the network administrator may wish to reset the threshold number of ports as the list of approved ports matures, as behavior of the users of the network changes, among other reasons.

The CRM 440 can be in communication with a computing device 402 having processor resources of more or fewer than 444-1, 444-2, . . . , 444-R, that can be in communication with, and/or receive a tangible non-transitory CRM 440 storing a set of computing device readable instructions 442 executable by one or more of the processor resources 444-1, 444-2, . . . , 444-R for detecting suspicious network activity using flow sampling. The stored instructions may be an installed program or an installation pack. If an installation pack, the memory, for example, can be a memory managed by a server such that the installation pack can be downloaded. The computing device may include memory resources 446, and the processor resources 444-1, 444-2, . . . , 444-R may be coupled to the memory resources 446.

Processor resources 444-1, 444-2, . . . , 444-R can execute computing device readable instructions 442 for detecting suspicious network activity using flow sampling. A non-transitory CRM (e.g., CRM 440), as used herein, can include volatile and/or non-volatile memory. Volatile memory can include memory that depends upon power to store information, such as various types of dynamic random access memory (DRAM), among others. Non-volatile memory can include memory that does not depend upon power to store information. Examples of non-volatile memory can include solid state media such as flash memory, EEPROM, phase change random access memory (PCRAM), magnetic memory such as a hard disk, tape drives, floppy disk, and/or tape memory, optical discs, digital video discs (DVD), Blu-ray discs (BD), compact discs (CD), and/or a solid state drive (SSD), flash memory, etc., as well as other types of CRM.

The non-transitory CRM 440 can be integral, or communicatively coupled, to a computing device, in either in a wired or wireless manner. For example, the non-transitory CRM can be an internal memory, a portable memory, a portable disk, or a memory located internal to another computing resource (e.g., enabling computing device readable instructions 380 to be downloaded over the Internet).

The CRM 440 can be in communication with the processor resources 444-1, 444-2, . . . , 444-R via a communication path 448. The communication path 448 can be local or remote to a machine associated with the processor resources 444-1, 444-2, . . . , 444-R. Examples of a local communication path 448 can include an electronic bus internal to a machine such as a computing device where the CRM 440 is one of volatile, non-volatile, fixed, and/or removable storage medium in communication with the processor resources 444-1, 444-2, . . . , 444-R via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof.

The communication path 448 can be such that the CRM 440 is remote from the processor resources 444-1, 444-2, . . . , 444-R such as in the example of a network connection between the CRM 440 and the processor resources 444-1, 444-2, . . . , 444-R. That is, the communication path 448 can be a network connection. Examples of such a network connection can include a local area network (LAN), a wide area network (WAN), a personal area network (PAN), and the Internet, among others. In such examples, the CRM 440 may be associated with a first computing device and the processor resources 444-1, 444-2, . . . , 444-R may be associated with a second computing device.

The above specification, examples and data provide a description of the method and applications, and use of the system and method of the present disclosure. Since many examples can be made without departing from the spirit and scope of the system and method of the present disclosure, this specification merely sets forth some of the many possible example configurations and implementations.

What is claimed:

1. A method for network security, comprising:
   receiving flow sampled network traffic from a plurality of network devices with a network monitoring computing device for network traffic among a plurality of computing devices;
   comparing source ports and destination ports in the flow sampled network traffic to a list of approved ports with the network monitoring computing device; and
   detecting suspicious network activity for flow sampled network traffic having a source port and a destination port exceptional to the list of approved ports with the network monitoring computing device.

2. The method of claim 1, wherein detecting suspicious network activity comprises detecting suspicious network activity for flow sampled traffic having neither a source port nor a destination port on the list of approved ports and adding at least one of the source port and the destination port from the flow sampled network traffic to a suspicious network activity list.

3. The method of claim 2, wherein detecting suspicious network activity includes associating the at least one of the source port and the destination port on the suspicious network activity list with a corresponding source address or destination address for each instance of the at least one of the source port and the destination port in the flow sampled network traffic.

4. The method of claim 3, wherein the method includes:
   sorting the suspicious network activity list in order according to a number of addresses associated with each port in the suspicious network activity list; and
   receiving an input from a network administrator to remove a particular port from the suspicious network activity list and add the particular port to the list of approved ports.

5. The method of claim 2, wherein detecting suspicious network activity includes generating a suspicious network activity alert when a new port is added to the suspicious network activity list in response to a total number of ports in the suspicious network activity list exceeding a threshold number of ports.

6. The method of claim 1, wherein the method includes:
   storing the received flow sampled network traffic in a database;
   populating a suspicious network activity list with the detected suspicious network activity;
   updating the list of approved ports; and
   repopulating the suspicious network activity list using the stored flow sampled network traffic from the database according to the updated list of approved ports.

7. The method of claim 1, wherein the method includes:
   storing the received flow sampled network traffic in a database;

populating a suspicious network activity list with the detected suspicious network activity;
updating the list of approved ports; and
erasing the suspicious network activity list in response to the list of approved ports being updated.

8. A non-transitory computing device readable medium storing instructions for network security executable by a computing device to cause the computing device to:
receive flow sampled network traffic from a plurality of network devices for network traffic among a plurality of computing devices;
compare source ports and destination ports in the flow sampled network traffic to a list of approved ports; and
maintain a suspicious network activity list for flow sampled network traffic having source and destination ports exceptional to the list of approved ports.

9. The medium of claim 8, wherein the instructions executable by the computing device to maintain the suspicious network activity list include instructions to:
add at least one of a source port and a destination port to the suspicious activity list for the flow sampled network traffic having source and destination ports exceptional to the list of approved ports; and
add at least one corresponding source addresses and corresponding destination addresses to the suspicious activity list for each instance of the at least one of the source port and the destination port in the flow sampled network traffic.

10. The medium of claim 9, wherein the instructions executable by the computing device to:
maintain the suspicious network activity list include instructions to sort the suspicious network activity list in descending order according to a number of addresses associated with each port in the suspicious network activity list; and
display the sorted suspicious network activity list to a network administrator.

11. The medium of claim 8, including instructions executable by the computing device to alert a network administrator when a port is added to the suspicious network activity list in response to a total number of ports in the suspicious network activity list being below a threshold number of ports.

12. The medium of claim 11, including instructions executable by the computing device to receive a modification to the threshold number of ports.

13. A network monitoring computing device for network security, comprising:
memory resources;
processing resources coupled to the memory resources to:
compare source ports and destination ports in flow sampled network traffic to a list of approved ports;
maintain a suspicious network activity list for flow sampled network traffic received from a plurality of network devices, the flow sampled network traffic having source ports and destination ports exceptional to the list of approved ports; and
alert a network administrator when a port is added to the suspicious network activity list in response to a total number of ports in the suspicious network activity list exceeding a threshold number.

14. The network monitoring computing device of claim 13, including the memory and processing resources to alert the network administrator by prompting the network administrator to restrict at least one of the suspicious network activity and a particular one of the plurality of user computing devices associated with the suspicious network activity.

15. The network monitoring computing device of claim 13, wherein the flow sampled network traffic is received from the plurality of network devices comprising switches having statistical flow sampling enabled.

* * * * *